United States Patent [19]

Kurimoto

[11] 4,265,300
[45] May 5, 1981

[54] GREENHOUSE DEVICE

[76] Inventor: Yoshitane Kurimoto, 4-14, 4-Chome, Ichikawa-Minami, Ichikawa-Shi, Chiba-Ken, Japan

[21] Appl. No.: 958,884

[22] Filed: Nov. 8, 1978

[30] Foreign Application Priority Data

Nov. 10, 1977 [JP] Japan ................. 52-135076

[51] Int. Cl.³ ............................................. A01C 1/00
[52] U.S. Cl. .......................................... 165/47; 47/17; 52/643; 52/93; 98/33 A
[58] Field of Search ............... 237/46, 53, 1 A; 47/17; 165/47, 53, 54; 98/33, 38; 52/643, 93

[56] References Cited

U.S. PATENT DOCUMENTS

| | | | |
|---|---|---|---|
| 2,963,819 | 12/1960 | Hoch | 47/17 |
| 3,348,922 | 10/1967 | Bose et al. | 47/17 X |
| 3,357,088 | 12/1967 | Hoffman et al. | 237/53 |
| 3,498,368 | 3/1970 | Conangle | 47/17 X |
| 3,613,308 | 10/1971 | Klein et al. | 47/17 |
| 3,673,733 | 7/1972 | Allen | 47/17 X |
| 3,925,928 | 12/1975 | Constantinescu et al. | 47/17 |
| 4,073,089 | 2/1978 | Maginnes et al. | 47/17 |
| 4,164,172 | 8/1979 | Anderten et al. | 98/33 R |

Primary Examiner—Albert J. Makay
Assistant Examiner—Henry Bennett
Attorney, Agent, or Firm—Becker & Becker, Inc.

[57] ABSTRACT

A greenhouse device or complex in which the roof, sidewall, front and rear sides of a lean-to-roof, saddle-roof or three-quarter type greenhouse is lined with an outside glass sheet and an inner glass sheet providing a double wall on all sides of the greenhouse. Warm air is generated in a warm air generator in which gaseous fuel/air mixture is combusted for heating the outside air and the heated air so produced is mixed with a relatively cool air to produce the warm air at a temperature suitable for plant growing. The warm air so obtained is then forced to flow through the double wall structure surrounding the sides and roof of the greenhouse. The air which has cooled may be used as said relatively cool air in the warm air generator.

3 Claims, 14 Drawing Figures

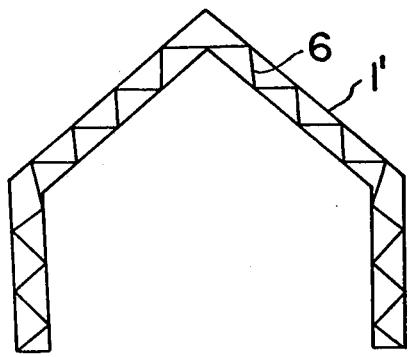
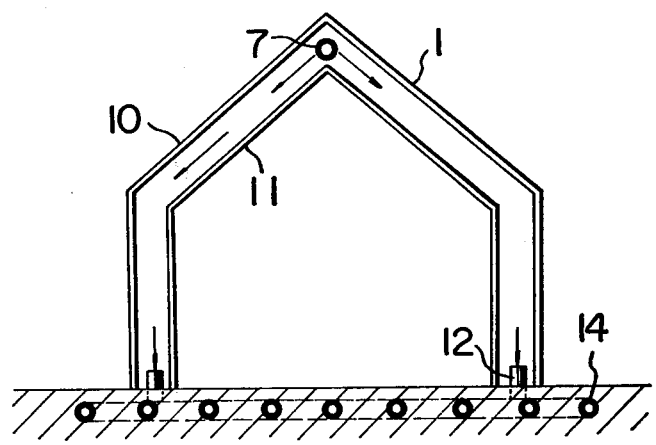

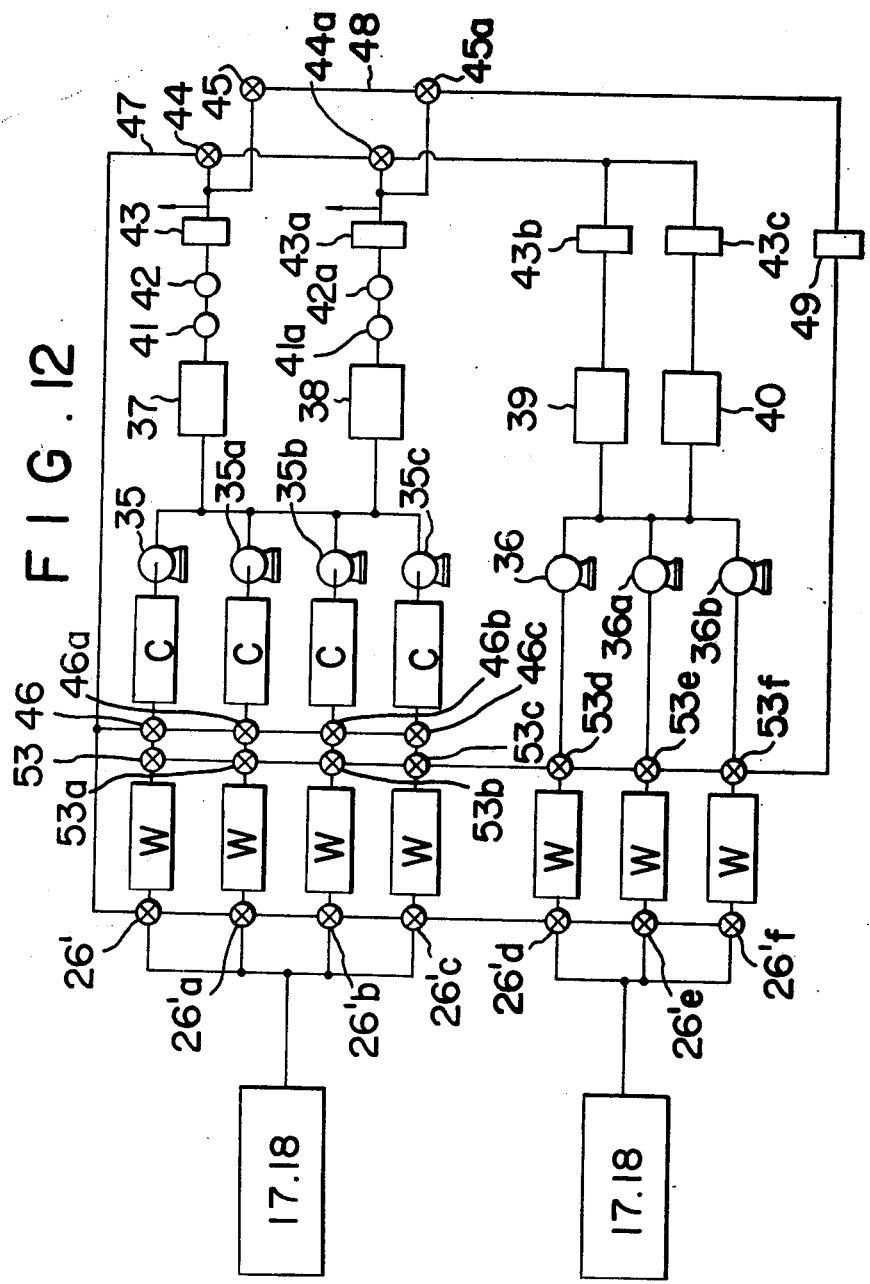

GREENHOUSE DEVICE

BACKGROUND OF THE INVENTION

This invention relates to a greenhouse device or complex of a relatively large scale that may be used especially in a frigid district where the outdoor temperature during winter may fall to −45° C. or even lower.

Heretofore, in using a glass greenhouse for growing of fruits, vegetables or flowers in such cold climate, the temperature difference between the inside and outside of the greenhouse may increase to that much during winter. Moreover, the ground surface will freeze from time to time. By this reason, a heating unit of a large capacity and/or an underground piping for circulation of warm water is usually necessary to install at the greenhouse site. In order to keep the inside of the greenhouse warm, a large size duct for warm air has to be mounted on the ground surface so as to be opened at a suitable elevation above the ground surface, and provision has to be made of a suction device on the opposite side for drawing warm air into the greenhouse from said duct.

The glass greenhouse so far employed may roughly be divided into a lean-to-roof, three-quarter, saddle-roof and a round-roof type. In the case of the most popular double-roof type, a plurality of equally spaced shape bars are connected to a central ridge beam and to one another by connecting bars for providing a roof portion or structure. The latter is carried by a plurality of mid pillars and a sidewall structure, the ends of which in the direction of the ridge beam are supported on an underground foundation for providing an overall frame structure.

A door for entrance into or exit from the greenhouse is provided on the front side of the greenhouse, and a suitable number of windows may be provided along the ridge beam and/or on the sidewall portion.

Alternatively, a suitable number of equally spaced rigid angle frame units may be provided for forming a skeleton structure for the greenhouse. In this case, it may be necessary to provide suitable reinforcements in both the roof and sidewall portions such as structs generally extending along the ridge beam.

The upper surface of the roof and sidewall portions of the greenhouse thus formed are usually lined for instance by a plastic fiber reinforced plate glass.

With the glass greenhouse of the above-described conventional design with a single plate glass, especially in frigid districts, the inside of the greenhouse cannot be warmed or kept warm sufficiently if only one or more heating units provided within the greenhouse are resorted to. In frigid districts, such as Hokkaido of Japan, the soil may become frozen to some depth below the ground level. Thus an underground pipe must be provided for circulating warm air and/or warm water for melting the frozen soil.

In a certain small size greenhouse such as those lined by a vinyl chloride sheet, only the roof portion is lined by two vinyl chloride sheets, the other portions of the greenhouse being lined with a vinyl single sheet. The basic concept of the inventive greenhouse is that it would be convenient to provide a double wall at the roof and all sides of the glass greenhouse and to utilize the space of the double wall to its best advantage. According to the present invention, there is provided a glass greenhouse in which upper and lower surfaces of the rigid angle frame units constituting the greenhouse skeleton structure are lined by glass plates for providing a roof portion, a sidewall portion a front surface and a rear surface all of which are lined by double glass plates. Within the internal space of the so defined double wall structure, the warm air from the same supply source as that used for warming the inside of the greenhouse is forced to flow for warming and keeping warm the inside of the greenhouse in conjunction with the usual heating by the conventional heating unit provided within the greenhouse.

The greenhouse of the present invention is basically designed for use in frigid districts for growing of cereals, vegetables or fruits. Hence, an underground piping system or network is embedded directly below and around the greenhouse for circulation therethrough of the warm air supplied from the same source.

If the warm air is not forced to flow down the inside of the double wall structure, the air will remain in the inside space of the double wall portion, thus giving rise to the transfer of heat through it and the double glass wall, by virtue of the complex heat transfer phenomenon consisting of heat radiation, convection and conduction. In a well-known manner, the resistance of the air layer to heat transfer does not increase in proportion to the increase in the thickness of the air layer. If the resistance to heat transfer and the thickness of the air layer are plotted on the ordinate and the abscissa, respectively, the resulting curve will be substantially parallel to the abscissa for a thickness of the air layer in excess of a predetermined value. The reason for this is that the heat transfer through the air layer is caused not only through heat conduction, but through heat convection and radiation, and especially heat convection will become a predominant factor with the increase in the air layer thickness. In the conventional double roof structure of the small size greenhouse, referred to above, a layer of asbestos or similar heat insulating material has been filled into the space of the double wall for compensation of insufficient heat insulating properties of the air layer. Such an artifice is naturally undesirable because the heat insulating layer will prevent the sunlight from entering into the greenhouse.

According to the greenhouse device of the present invention, described above, the warm air from the same source as that used for delivery of warm air into the inside of the greenhouse is forced to flow down the inside of the double wall. Thus the heat which may otherwise be transferred between the inner and outer walls of the double wall structure is absorbed by the warm air for positively preventing the heat transfer through convection from taking place. The warm air supplied to the double wall structure constitutes a warm air curtain serving itself as heat insulating layer. If, owing to the temperature difference between the inside and outside of the double wall portion, the wall surface has been cooled to lower than the dew point, with resulting dew formation on the wall surface, such moisture will be entrained in the warm air flow and hence no cloud will be generated on the glass surface.

The total amount of the warm air to be supplied to the double wall structure can be calculated by obtaining the heat flow per unit area through the two glass plates and the air layer therebetween, multiplying the heat flow rate thus obtained by the total surface area of the double wall structure for obtaining the heat flow, and dividing the latter by the enthalpy of the warm air, as will be described below.

The warm air which has been cooled after routing through the inside of the double wall structure and the underground piping system is returned to the entrance to the warm air generating unit or to the air conditioner at the exit side of the generating unit. In either cases, the air so returned is passed through a measuring unit for measuring the amounts of oxygen and toxic gases and added with oxygen as the occasion may demand. The air is then routed to the inside of the living and control space or the greenhouse, or to the inside of the double wall and the underground piping network for circulation, bypassing the conditioned air generator.

The warm air, which has been cooled more or less after its routing through the inside of the double wall structure, is recirculated through the warm air generating and conditioning unit which forms part of the inventive greenhouse device. The air so circulated may be used for mixing with the hot air in place of the outside air, depending on the prevailing outside air temperature, as will be discussed in more detail.

The temperature of the warm air may be in the range of 0° to +40° C., depending on the usage of the greenhouse.

BRIEF DESCRIPTION OF THE DRAWINGS

FIG. 3 is a front view showing a modified angle frame unit;

FIG. 3a is an explanatory view showing the state of operation of the double wall section;

FIG. 12 is a block view of the greenhouse device with plural hot air generators.

DESCRIPTION OF THE PREFERRED EMBODIMENT

Figure 1:
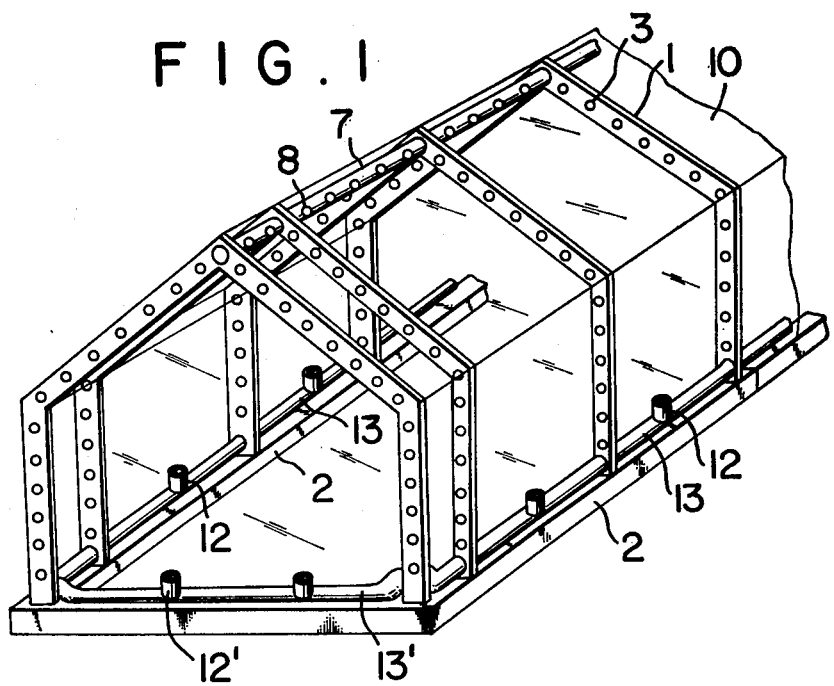
FIG. 1 is a perspective view showing the skeleton structure of the greenhouse section.
Figure 1A:
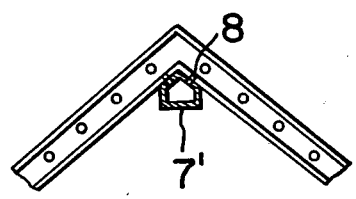
FIG. 1a is a partial enlarged view showing a modified ridge beam.
Figure 2:
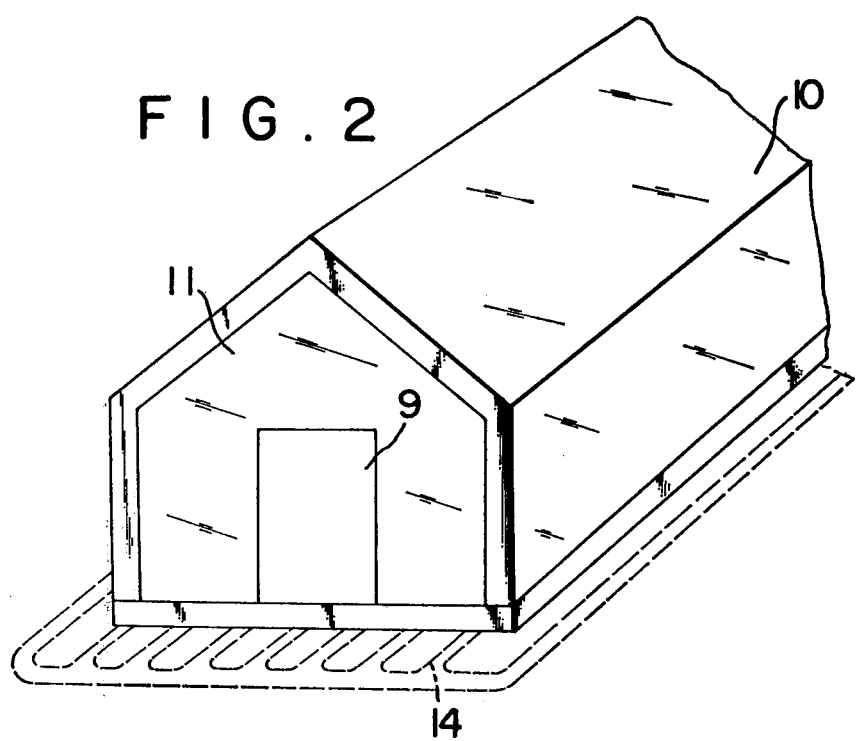
FIG. 2 is a perspective view showing the completed greenhouse shown in FIG. 1.
Figure 7:
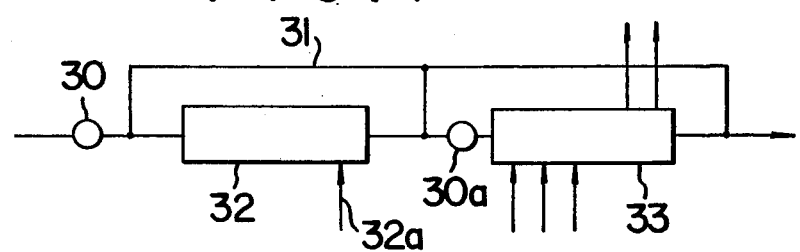
FIG. 7 is a block view of the air conditioner.

Referring to FIG. 1, there is illustrated a skeleton structure of the greenhouse of the present invention. The numeral 1 designated a suitable number of rigid angle frame units equally spaced from and aligned to one another and secured on a foundation 2. Each frame 1 is formed with a number of equally spaced perforations 3 for routing the air into an associated section or room of the greenhouse defined by associated certain walls, as will be described. An angle frame unit 1' as shown in FIG. 3 wherein an inner angle truss and an outer angle truss are connected together by cross struts may be used in place of the angle frame unit 1 of FIG. 1. A duct 7 is provided along an imaginary line connecting the apieces of the angle frame units 1. The duct 7 is connected to the discharge side of a warm air generating unit to be later described and has a number of air discharge perforations 8 on its periphery for discharging the warm air into the inside of the double wall. The upper and lower sides of the angle frame units 1 of the skeleton structure are lined with transparent and snow- and wind- resistant glass plates 10, 11, such as plastic fiber reinforced glass plates, for completing the greenhouse as shown in FIG. 2. The two angle frame units on both the front and rear sides are spaced apart by a distance smaller than the distance between any two remaining frame units 1 and are lined on both sides by the glass plates. Thus the greenhouse is surrounded or formed on all sides with a double wall through which there is a continuous supply of warm air by way of the perforations in a ridge duct 7 and the angle frames units. The entrance and exit means 9 is formed in the outermost glass plate. The warm air discharged from the perforations 8 of the duct 7 by way of a discharge pipe 29 of the warm air generating unit and a blower 36 is forced to flow down the inside of the overall double wall portion and may be introduced into opening ends 12 of a suction duct 13 mounted at the lower end of the side wall (FIG. 1a). The warm air is then supplied selectively to an intake pipe 25 at the entrance to the warm air generating unit or to a entrance to a conditioned air generator (FIG. 7).

The double wall on the front and rear sides is also supplied through perforations 8 with warm air, which is then supplied usually through a duct 12' and a horizontal duct 13' connecting with the suction duct 13 to the inlet of the warm air generating unit, as will be described.

A pentagonal air duct 7' as shown in FIG. 1a may be used in place of the cylindrical ridge duct 7. The duct 7' may be mounted to the respective lower sides of the apieces of the angle frame units 1. Through-openings 8' are formed in the duct 7' and the frame units 1 for communication between the duct 7' and the double wall. In this case, the adjacent frame units are connected together by a separate ridge beam, not shown, provided along the apieces of the angle frames units.

Figure 4:
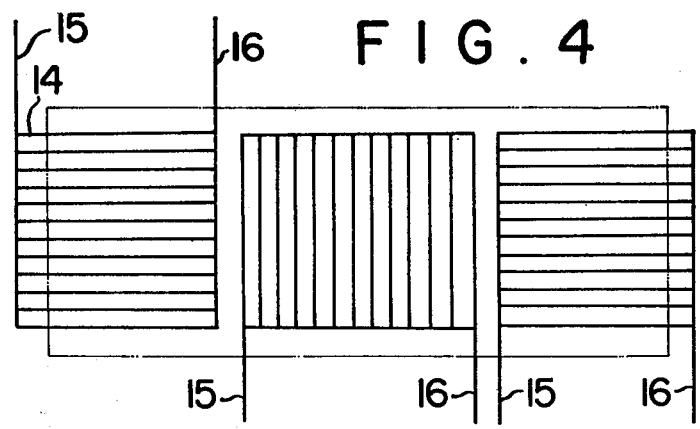
FIG. 4 is a plan view of the underground piping section.

The warm air supplied from discharge line 29 of the warm air generating unit and the blower 36 is also supplied into an underground piping system 14 embedded directly below and around the greenhouse for some distance. If the greenhouse has a large area, the network 14 is preferably divided into plural groups, as shown in FIG. 4, in consideration that otherwise the piping length would be increased to that much and the warm air would become excessively cool at the exit side of the piping. The inlet sides of the respective groups of the piping system 14 are connected through a pipe 15 to the discharge line 29 of the warm air generating unit. The outlet sides are connected to a pipe 16 and thence to an inlet pipe 25 of the warm air generator or to the inlet of the conditioned air generator (FIG. 7), as the occasion may demand.

FIG. 3a illustrates the manner in which warm air is forced to flow down the double wall portion of the greenhouse.

Figure 5:
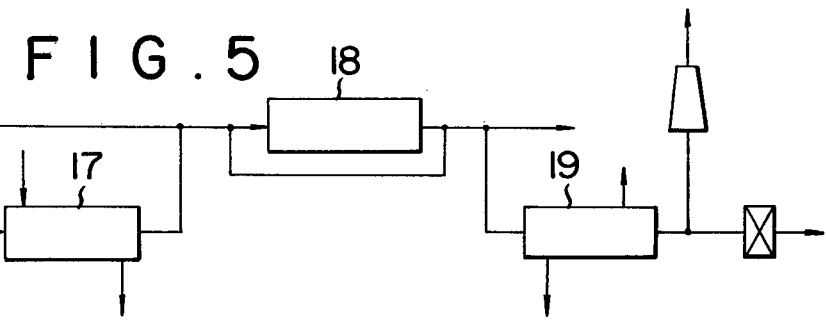
FIG. 5 is a block view of the fuel vaporizer-desulfurizer unit.
Figure 6:
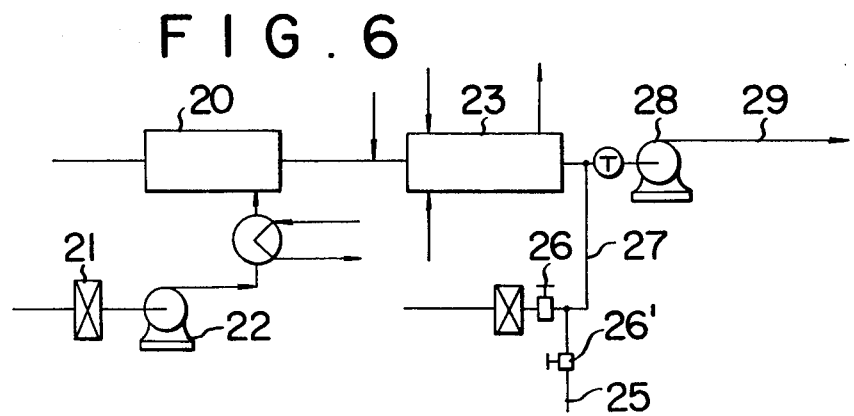
FIG. 6 is a block view of the warm air generating unit.

FIG. 5 shows a vaporizer-desulfurizer unit for fuel that is used in the greenhouse device. If the fuel is liquid, it is vaporized at the vaporizer 17 and then supplied to a desulfurizer 18 containing activated charcoal. If the fuel is gaseous, it is supplied directly to the desulfurizer 18. The desulfurized gaseous fuel is supplied to a stoichiometric mixer 20 (FIG. 6) and a boiler 19. The boiler is used for domestic power generation and therefore can be dispensed with for an area where commercial supply of electrical power is available. Among the liquid fuels that may be used in the present invention are liquid petroleum fuel such as naphtha, gasoline, kerosene and light oil. Among the gaseous fuels that may be used in the present invention are liquefied petroleum gas (LPG) and liquefied natural gas (LNG) but the liquefied petroleum gas is by far the most preferred.

The gaseous fuel supplied to the mixer 20 is mixed with a stoichiometrically suitable amount of outside air (14 vol. part of air to 1 vol. part of gaseous fuel) supplied through a filter 21 and a blower 22, and is introduced into a hot air generating unit 23. If the gaseous fuel and outside air are mixed and burned at the said ratio, the amount of COx in the generated hot air may be lowered. Preferably, the fuel air mixture is supplied into a double tube nozzle simultaneously with steam for lowering the amount of NOx in the hot air, in a known manner. Preferably, a cooling jacket is mounted around the generator 23 for continually circulating cooling water around the generator 23. Outside air is supplied into the generator 23 via a supply duct separate from the double tube nozzle and heated to about 1100°-1200° C. by combustion of the fuel-air mixture within the generator 23. An intake pipe 24 for outside air and another intake pipe 25 for circulated warm air from the discharge pipe 16 of the piping system 14 and the suction pipe 13 may be selectively connected to a line 27 by changeover valve means 26, 26'. The outside air from the changeover valve 26 or the warm air from valve means 26' are supplied, together with the hot air from the generator 23, to the discharge line 29 through a blower 28. The mixture ratio is suitably controlled by use of a thermostat T provided upstream of the blower 28 so that the warm air in the range of 5° to 35° C. may be produced depending on the greenhouse usage. The warm air of 5° to 35° C. may be obtained by setting the capacity of the warm air generator to 0° to 40° C.

The generator 23 is not used during the summertime and only the outside air is supplied to the line 29 by the blower 28.

The warm air which has not been supplied from the blower 36 to the duct 7 and the piping 14 is delivered to the conditioned air generator, including an oxygen supply unit 32, shown schematically in FIG. 7. A measuring device 30 for oxygen and toxic gases is provided at the entrance to the unit 32 for carrying out an analysis of the oxygen and toxic gases contained in the warm air. If more than predetermined amounts of toxic gases such as NOx, SOx or COx are contained in the warm air, or there is any deficiency in oxygen contents, the warm air is not supplied through a bypass pipe 31, but is supplied through the device 32 where the required amount of oxygen is added through pipe 32a for adjusting the oxygen contents in the warm air. If, after oxygen addition, the result of the analysis is still unsatisfactory, the air is discharged into the atmosphere. Another measuring device 30a is mounted at the exit side of the measuring device 32 for further measuring the contents of oxygen and toxic gases. The amount of oxygen supplied from the pipe 32a is adjusted from the result of the analysis obtained by the measuring device 30a. The warm air thus adjusted to the optimum oxygen contents is supplied to an air conditioner 33 for air warming, cooling and/or dehumidification. The air conditioner 33 may be controlled by a digital or analog computer in a well-known manners. The bypass pipe 31 is used for allowing the air to bypass the device 32 depending on the result of the analysis obtained by the measuring device 32 and supplying the warm air directly to the air conditioner 33.

Figure 8:
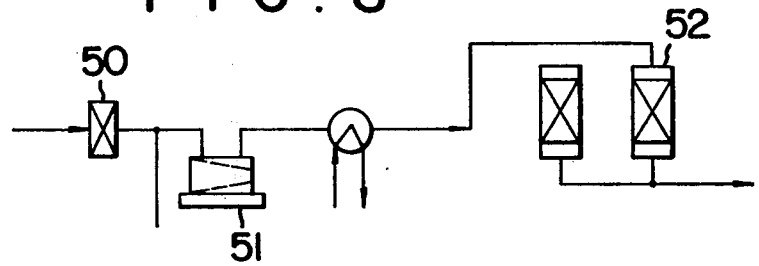
FIG. 8 is a block view of the deterging unit.
Figure 9:
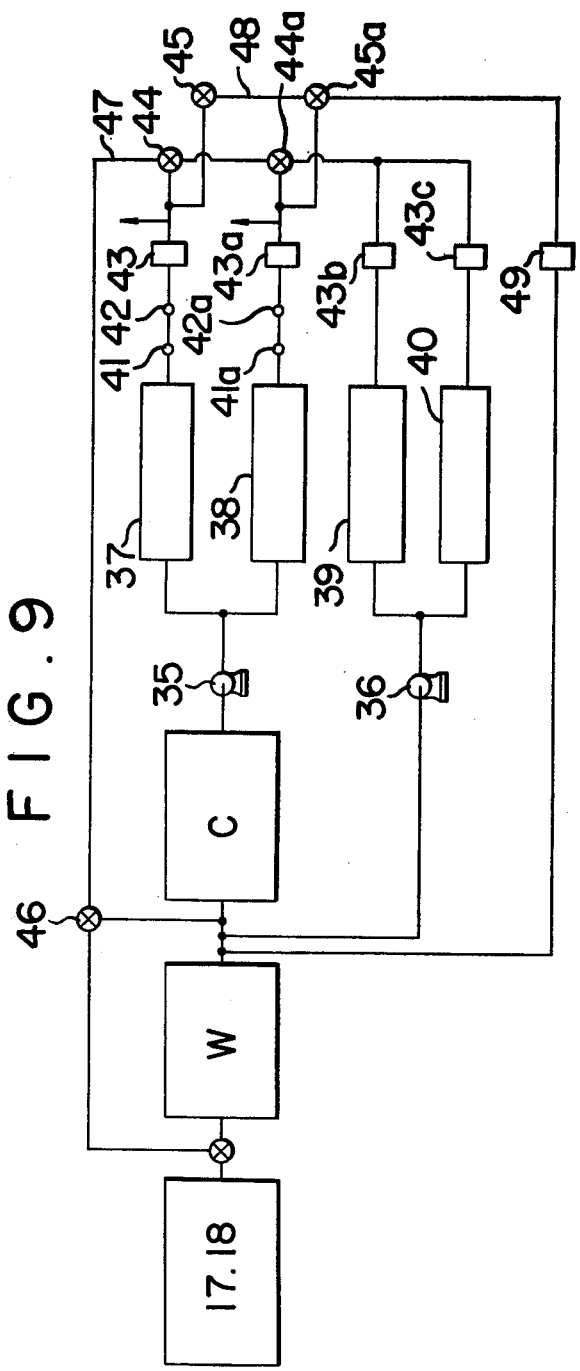
FIG. 9 is a block view of the overall greenhouse device.
Figure 10:
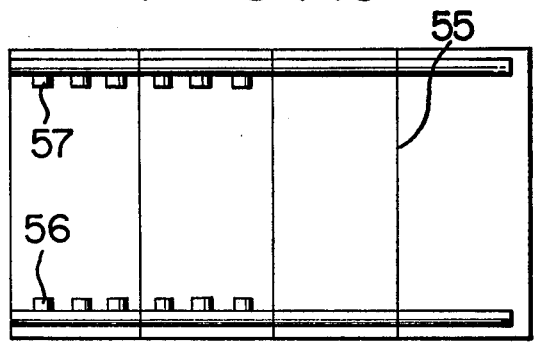
FIG. 10 is a plan view of the inside of the greenhouse section.

FIG. 9 is a block view of the overall greenhouse device. In FIG. 9, the conditioned air generator is connected to the discharge side of the warm air generator. The conditioned warm air from the conditioned air generator is supplied by blower 35 into a greenhouse section 37 and a living and control space 38, while the warm air from the warm air generator is supplied by the blower 36 directly to the double wall section 39 and the underground piping section 40. Occasionally, two or more warm air generators need be connected in parallel relation to two or more vaporizer/desulfurizer units depending on the size of the greenhouse. On such an occasion, the number of the warm air generators, conditioned air generators and blowers 35, 36 has to be increased correspondingly. In any case, the warm air to be supplied to the underground piping system 40 and the double wall section 39 is supplied directly from the warm air generator, without routing through the conditioned air generator. The greenhouse section 37 is connected through a dust-bacteria analyzer 41, a measuring device for oxygen and toxic gases 42 and a filter 43 to lines 47, 48 by way of changeover valves 44, 45, respectively. The living/control space 38 is similarly connected through a dust-bacteria analyzer 41a, measuring device 42a and a filter 43a to the lines 47, 48 by way of changeover valves 44a, 45a. The warm air may be discharged to atmosphere as indicated into the arrowmarks depending on the result of the analysis of oxygen and toxic gas contents. The piping section 40 and the double wall section 39 are connected to the line 47 through filters 43b, 43c. The end of the line 47 corresponds to the intake pipe 25 of FIG. 6. The changeover valves 26, 26' may be operated so that the warm air from line 47 or the outside air may be used selectively for mixing with heated air from the generator 23. A pipe is branched off from pipe 47 by a changeover valve 46 and connected to the entrance to the conditioned air generator so that the circulated warm air may also be supplied to the conditioned air generator. A pipe 48 connects to the entrance to the conditioned air generator through a deterging unit 49 provided with a filter 50, a compressor 51 and a dust filter 52 (FIG. 8). The circulated warm air is supplied through an inlet to the unit and compressed in the comspressor 51 together with the outside air from the filter 50 and thereby heated to about 200° C. for deterging. A deterging unit different from that shown in FIG. 8 may also be used, and the units 41, 41a, 48 may also be dispensed with according to the greenhouse usage.

The changeover valves 44, 44a, 45, 45a may be used for returning the warm air directly into the entrance to the conditioned air generator or the warm air generator, or into the conditioned air generator through the deterging unit 49, depending on the state of the warm air in the greenhouse section 47 and the living/control space 38.

In the block view of FIG. 9, the greenhouse section 37 includes a greenhouse per se and a seedling bed, while the space 38 includes an office, a lodging space, a crop storage, a fertilizer storage, a farming machine warehouse and a tool storage. These spaces are accessible to operating personnel and therefore would require the same air conditioning.

The greenhouse section 37 shown in a block of FIG. 9 is divided into several rooms by curtain walls (FIG.

10), each said room having a suitable number of air discharge openings 56 and suction openings 57. The openings 56 are connected to the blower 35 (FIG. 9) while the openings 57 are connected to the filter 43 (FIG. 9) through the dust-bacteria analyzer 41 and the oxygen-toxic gas measuring device 42. Preferably, the supply of warm air into the greenhouse section 37 may be interrupted from time to time from the viewpoint of plant growing or cultivation.

Figure 11:
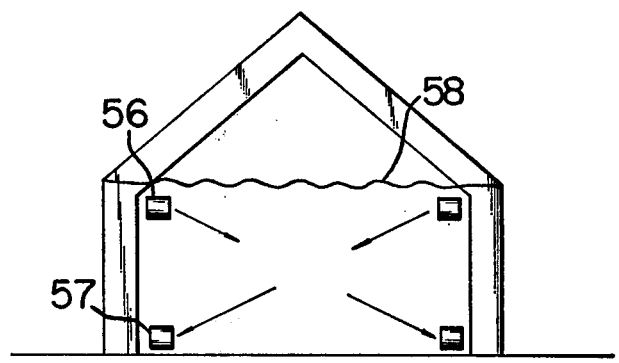
FIG. 11 is a side view thereof.

In FIG. 11, a curtain wall 58 is provided at the ceiling. The curtain walls 55, 58 are opened or closed as the occasion may demand for controlling the quantity of warm air.

The amount of warm air necessary for temperature control of the overall greenhouse and keeping the melted soil depth to 1m and the total capacity of the hot air generator have been calculated for the case of the double roof greenhouse which is 60 m width, 200 m length and 4 m height and provided with the double wall which is 1m in width. The outside air temperature is 10° C., the warm air circulated through the double wall section 39 and the piping section 40 is 30° C. The same warm air is supplied into the greenhouse, while the circulated warm air is not used for mixing. The result is shown in the following Table.

| | |
|---|---|
| capacity of double wall section | 16990 m³ |
| capacity of greenhouse section | 152400 m³ |
| heat flow through double wall section | 18420000 kcal/h |
| heat flow through underground piping | 5400000 kcal/h |
| total warm air inside greenhouse | 2470000 m³/h |
| total circulation air in double wall section | 710000 m³/h |
| total circulation air in underground piping section | 620000 m³/h |
| total circulation air in double wall and underground piping sections | 1330000 m³/h |

The mixture ratio between the hot air from the generator 23 and the outside air from the intake pipe 24 is about 30.3, so the warm air amounts to 626000 m³/h if the generator oven 23 of 20000 Nm³/h is used. Thus, in order to supply warm air into the inside of the greenhouse section 37 and the space 38, 4 generators 23 are found to be necessary from a division 2470000÷626000 which equals about 3.9. On the other hand, about 3 generators 23 are found to be necessary for generation of insulating air, as will be apparent from a division 1330000÷626000 which equals about 2.1.

The overall block view of the greenhouse device for this typical case is shown in FIG. 12. The greenhouse section 37 and the living/control space 38 are connected to 4 warm air generators through 4 blowers 35, 35a, 35b, 35c and 4 conditioned air generators. The double wall section 39 and the piping section 40 are connected to 3 warm air generators through 3 blowers 36, 36a, 36b. The numerals 26', 26'a, 26'b, 26'c, 26'd, 26'e and 26'f designate changeover valves connecting to intake pipes 25 of the respective warm air generators. The numerals 46, 46a, 46b, 46c designate changeover valves mounted midway in the line 47. The numerals 53, 53a, 53b, 53c, 53d, 53e, 53f designate changeover valves mounted in the line 48. In other respects, the block view of FIG. 12 is substantially identical with the block view of FIG. 9.

The result of calculation for the amount of warm air and the total capacity of the hot air generator necessary with the above greenhouse and for the outside air temperature of −45° C. is shown in the following Table.

| | |
|---|---|
| capacity of double wall section | 16990 m³ |
| capacity of greenhouse section | 152400 m³ |
| heat flow through double wall section | 34540000 kcal/h |
| heat flow through underground piping section | 7400000 kcal/h |
| total circulation air in greenhouse section | 1320000 m³/h |
| total circulation air in piping section | 850000 m³/h |
| total circulation air in double wall and piping sections | 2170000 m³/h |

With the mixture ratio between the hot air from the generator 23 and the outside air from the intake pipe 24 about equal to 16.6, the warm air amounts to 352000 m³/h for the generator 23 with a capacity of 20000 Nm³/h. Thus 7 generators 23 are found to be necessary for the supply of warm air into the greenhouse, as will be apparent from a calculation 2470000÷352000 which equals about 7.02. On the other hand, about 7 hot air generators 23 are necessary for generation of insulating air, as calculated from a division 2170000÷352000 which equals about 6.2.

In using the greenhouse device during summer, the operation of the device portions upstream of and including the generator 23 is interrupted and the generator 23 is supplied only with outside air for ventilation of the greenhouse section 37 and the living/control space 38. In this case, the double wall section 39 and the piping section 40 are disconnected from the circulation air by closing valve means, not shown, provided in the piping from the warm air generator to the blower 36.

According to the invention warm air is supplied into the inside of the double walled roof and side wall and into the underground piping system, thereby heat insulating the greenhouse section and keeping the soil directly beneath and adjacent laterally to the greenhouse relatively warm. Thus the device of the present invention is especially suitable for growing of cereals, vegetables or fruits in a frigid district where the outside air temperature during winter may fall to −45° C. or lower.

Although the present invention has been described by reference to a preferred embodiment illustrated in the drawings, various changes can be made by those skilled in the art within the scope of the present invention. For instance, the present invention can be equally applied to a lean-to-roof, saddle-roof or round-roof type greenhouse by a simple change in designing.

What is claimed is:

1. A system for generating and conditioning warm air for a greenhouse assembly having a greenhouse section, a double wall structure and an underground piping section, which includes a desulfurizer for gaseous fuel; a warm air generating device comprising a hot air generator in which the gaseous fuel is mixed and combusted with a stoichiometric amount of outside air for generating heated air and a mixer in which the heated air is mixed with relatively cool air for generating the warm air at a temperature suitable for plant growth; a conditioned air generator provided and connected to the outlet of said mixer for measuring the amount of oxygen and toxic gases in the warm air obtained from said mixer, adding oxygen thereto in case of necessity and further heating, cooling and dehumidifying the warm air, and means for routing the warm air passed through the conditioned air generator to the greenhouse section and means for routing the warm air which has not passed through the conditioned air generator to the double wall structure and the underground piping section.

2. A system for generating and conditioning warm air for a greenhouse assembly having a greenhouse section, a double wall structure and an underground piping section, which includes a desulferizer for gaseous fuel; a warm air generating device comprising a hot air generator in which the gaseous fuel is mixed and combusted with a stoichiometric amount of outside air for generating heated air and a mixer in which the heated air is mixed with relatively cool air for generating the warm air at a temperature suitable for plant growth; a conditioned air generator provided and connected to the outlet of said mixer for measuring the amount of oxygen and toxic gases in the warm air obtained from said mixer, adding oxygen thereto in case of necessity and further heating, cooling and dehumidifying the warm air, and means for passing air through and also delivering the discharge air from the greenhouse section, the double wall structure and the underground piping section directly to the entrance of the conditioned air generator.

3. The system for generating and conditioning warm air for a greenhouse assembly having a greenhouse section, a double wall structure and an underground piping section, which includes a desulferizer for gaseous fuel; a warm air generating device comprising a hot air generator in which the gaseous fuel is mixed and combusted with a stiochiometric amount of outside air for generating heated air and a mixer in which the heated air is mixed with relatively cool air for generating the warm air at a temperature suitable for plant growth; a conditioned air generator provided and connected to the outlet of said mixer for measuring the amount of oxygen and toxic gases in the warm air obtained from said mixer, adding oxygen thereto in case of necessity and further heating, cooling and dehumidifying the warm air, and means for passing air through and also delivering the discharge air from the greenhouse section, the double wall structure and the underground piping section through a deterging unit to the entrance of the conditioned air generator.

* * * * *